United States Patent [19]

Ahlert et al.

[11] Patent Number: 4,749,628
[45] Date of Patent: Jun. 7, 1988

[54] MULTILAYERED VERTICAL MAGNETIC RECORDING MEDIUM

[75] Inventors: Richard H. Ahlert, San Jose; James K. Howard, Morgan Hill; Grace S. Lim, San Jose, all of Calif.

[73] Assignee: International Business Machines Corporation, Armonk, N.Y.

[21] Appl. No.: 857,206

[22] Filed: Apr. 29, 1986

[51] Int. Cl.⁴ .................. H01F 10/16; H01F 10/30
[52] U.S. Cl. ................................. 428/660; 428/668; 428/694; 428/900; 428/928
[58] Field of Search .............. 428/611, 635, 656, 660, 428/664, 668, 670, 678, 928, 694, 702, 900; 427/131

[56] References Cited

U.S. PATENT DOCUMENTS

| | | | |
|---|---|---|---|
| 3,350,180 | 10/1967 | Croll | 427/131 |
| 3,479,156 | 11/1969 | Ginder | 428/635 |
| 3,508,887 | 4/1970 | Chezel et al. | 428/656 |
| 3,516,076 | 6/1970 | Stein | 340/174 |
| 3,595,630 | 7/1971 | Wilhelm et al. | 427/131 |
| 3,787,237 | 1/1974 | Grunberg | 428/928 |
| 4,277,809 | 7/1981 | Fisher et al. | 428/900 |
| 4,438,066 | 3/1984 | Aboaf et al. | 428/928 |
| 4,543,301 | 9/1985 | Yazawa et al. | 428/694 |
| 4,587,176 | 5/1986 | Carcia | 428/694 |
| 4,610,911 | 9/1986 | Opfer et al. | 428/900 |
| 4,610,935 | 9/1986 | Kumasaka et al. | 428/678 |
| 4,629,660 | 12/1986 | Sagoi et al. | 427/131 |
| 4,632,883 | 12/1986 | Howard et al. | 428/694 |
| 4,657,824 | 4/1987 | Howard | 428/678 |
| 4,677,032 | 6/1987 | Robinson | 428/641 |

FOREIGN PATENT DOCUMENTS

| | | |
|---|---|---|
| 140513 | 5/1985 | European Pat. Off. |
| 145157 | 6/1985 | European Pat. Off. |
| 83218 | 5/1985 | Japan |
| 2125069 | 2/1984 | United Kingdom |

OTHER PUBLICATIONS

J. A. Aboaf, et al., "Magnetic Properties and Structure of Co-Pt Thin Films," IEEE Trans. on Magnetics, MAG-19 1514 (1983).
M. Kitada, et al., "Magnetic Properties of Sputtered Co-Pt Thin Film," J. Appl. Phys. 54(12), Dec. 1983, pp. 7089-7094.
J. E. Opfer, et al., "Thin Film Memory Disc Development," Hewlett-Packard Journal, Nov. 1985, pp. 4-10.
K. Kobayashi, et al., "High Density Perpendicular Magnetic Recording on Rigid Disks", Fujitsu Scientific & Technical Journal, vol. 19, No. 1 (Mar. 1983), pp. 99-126.

Primary Examiner—George F. Lesmes
Assistant Examiner—William M. Atkinson
Attorney, Agent, or Firm—Thomas R. Berthold

[57] ABSTRACT

A vertical magnetic recording medium is formed of multiple layers, each layer comprising a cobalt-platinum (CoPt) magnetic film formed on a hexagonal-close-packed (HCP) necleating film. The thickness of each CoPt film in each layer is sufficiently thin to assure that the film has perpendicular magnetic anisotropy. The magnetic properties of the multilayered magnetic film structure can be varied by varying the thickness of the individual films and the number of layers.

1 Claim, 4 Drawing Sheets

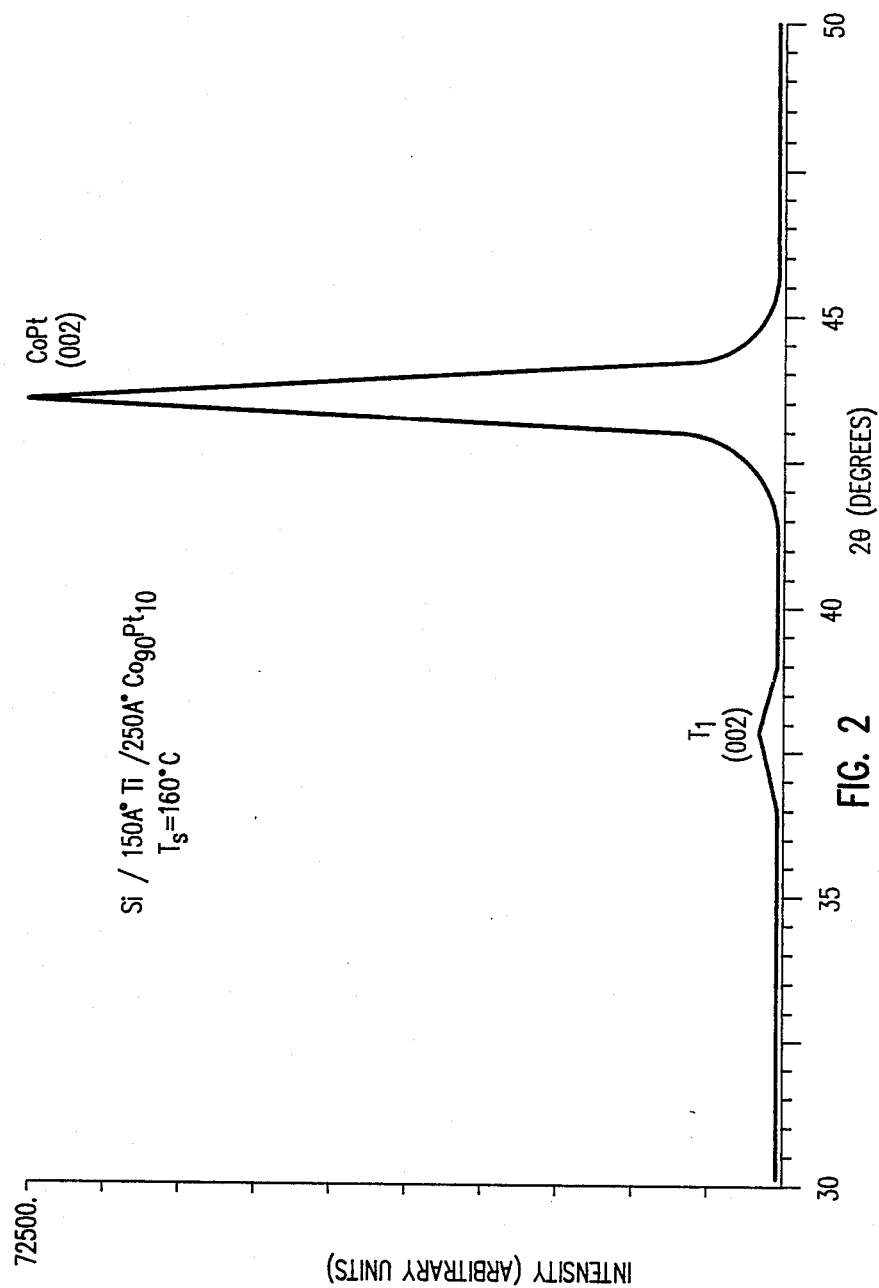

MULTILAYERED VERTICAL MAGNETIC RECORDING MEDIUM

BACKGROUND OF THE INVENTION

1. Field of the Invention

This invention relates to thin film metal alloy magnetic recording media, and in particular to a multilayered thin film metal alloy medium for vertical magnetic recording in which an alloy comprising cobalt and platinum forms the magnetic film in each of the layers.

2. Description of the Prior Art

Cobalt-based alloys which are known as capable for use in horizontal magnetic recording include cobalt-nickel (CoNi), cobalt-rhenium (CoRe), cobalt-palladium (CoPd) and cobalt-platinum (CoPt). In such media, the hexagonal-close-packed (HCP) crystalline structure of the cobalt alloy is formed on the substrate, or on an intermediate underlayer, so that the C-axis, i.e. the [002] axis, of the cobalt alloy film is either in the plane of the film or has a component in the plane of the film.

It has been found that in the case of CoPt films for horizontal recording, the horizontal coercivity ($H_c$) is dependent upon the composition of the platinum, with the maximum $H_c$ occurring at approximately 20 atomic percent (at. %) platinum. See J. A. Aboaf, et al., "Magnetic Properties and Structure of Co-Pt Thin Films", *IEEE Trans on Magnetics*, MAG-19, 1514 (1983), and M. Kitada, et al., "Magnetic Properties of Sputtered Co-Pt Thin Films", *J. Appl. Phys.* 54 (12), December 1983, pp. 7089-7094. The horizontal coercivity and other properties of cobalt-platinum films have been reported by Opfer, et al., in an article entitled "Thin-Film Memory Disc Development," *Hewlett-Packard Journal*, November 1985, pp. 4-10.

In order to improve the coercivity of the CoPt magnetic film in certain types of disks for horizontal recording, a chromium (Cr) or chromium alloy underlayer may be formed between the substrate and the CoPt magnetic layer. The use of a Cr underlayer in a CoPt thin film disk is described in the above-referenced article by Opfer, et al., and in European patent application No. 145157, published June 19, 1985 and assigned to the Hewlett-Packard Company. The use of a chromium-cobalt (CrCo) alloy as an underlayer for various types of magnetic layers, including CoPt, is suggested in European patent application No. 140513, published May 8, 1985 and assigned to the same assignee as this application.

In contrast to thin film horizontal recording media, the thin film metal alloy for vertical magnetic recording is typically a single magnetic layer having an ordered crystalline structure with perpendicular magnetic anisotropy. The conventional material for vertical recording is a cobalt-chromium (CoCr) alloy which is sputter-deposited on the substrate, or on an intermediate nucleating layer deposited on the substrate, to form a film having an HCP crystalline structure with the C-axis oriented generally perpendicular to the substrate. The magnetic properties of thin film metal alloy vertical recording media made with various substrates, a titanium (Ti) nucleating layer and a single-layer CoCr perpendicular magnetic film are described by Kobayashi, et al. in "High Density Perpendicular Magnetic Recording on Rigid Disks", *Fujitsu Scientific & Technical Journal*, Vol. 19, No. 1 (March 1983), pp. 99-126. Great Britain patent application No. 2125069, published Dec. 29, 1983, describes a thin film disk for vertical recording which uses a single layer of cobalt-chromium-platinum (CoCrPt), with Pt comprising between 1 and 5 at. %.

SUMMARY OF THE INVENTION

The invention is a vertical magnetic recording medium in which a multilayered magnetic film structure is formed on a suitable substrate. Each layer in the multilayered structure includes a nucleating film of a substantially HCP material and a magnetic film of an HCP alloy of the type conventionally used in horizontal recording, such as a CoX alloy, where X is an element from the group consisting of platinum, nickel, rhenium and palladium. The magnetic film in each of the layers is less than a predetermined thickness in order to insure that the film has perpendicular magnetic anisotropy. While the perpendicular coercivity of a single layer is insufficient to provide media suitable for vertical recording, the multilayered film structure, wherein each layer includes a magnetic film with its C-axis oriented perpendicular to the film plane, results in media with sufficient coercivity and other magnetic properties.

In one embodiment the multilayered structure has at least three layers, each layer comprising a nucleating film of an intermetallic cobalt-tungsten compound ($Co_3W$) of 150 Angstroms thickness and a CoPt magnetic film of 250 Angstroms thickness.

For a fuller understanding of the nature and advantages of the present invention, reference should be made to the following detailed description taken in conjunction with the accompanying drawings.

BRIEF DESCRIPTION OF THE DRAWINGS

FIG. 2 is an X-ray diffraction curve for a 250 Angstroms thick CoPt film formed on a 150 Angstroms thick Ti nucleating film;

DESCRIPTION OF THE PREFERRED EMBODIMENTS

Figure 1:
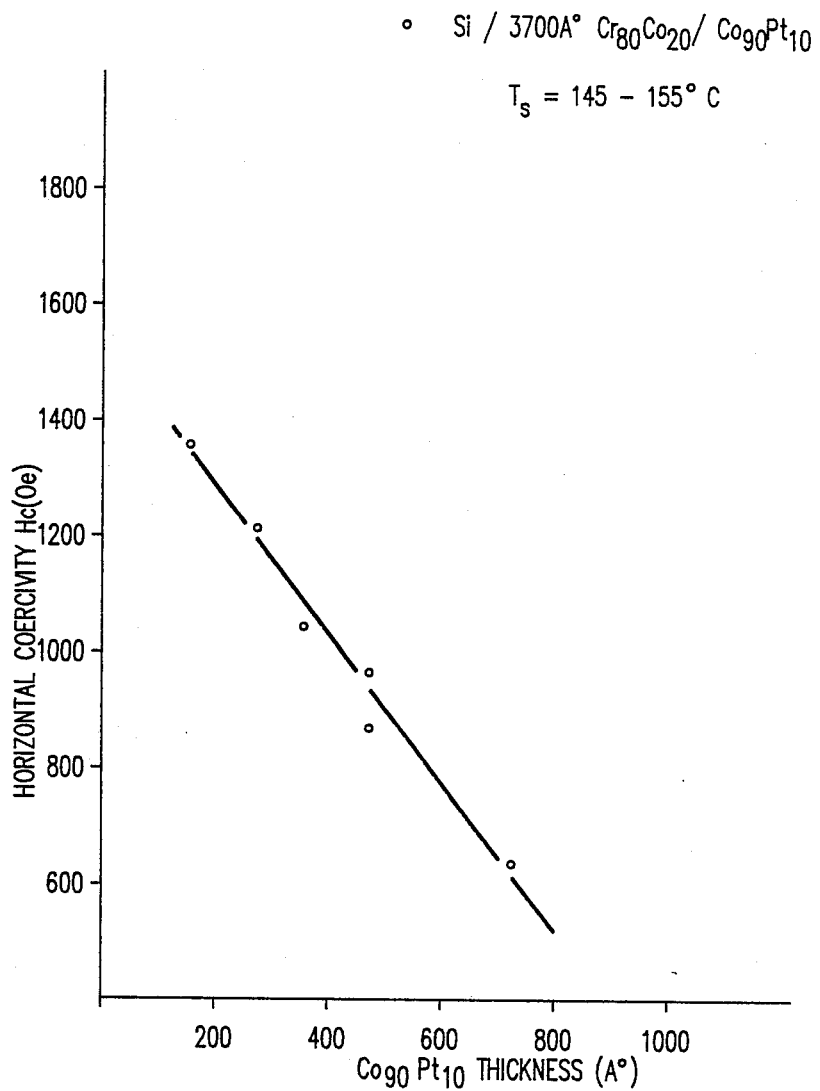
FIG. 1 is a graph illustrating the horizontal coercivity of a CoPt film over a CrCo nucleating film as a function of CoPt film thickness.

Thin films of cobalt-platinum (CoPt) for horizontal recording are typically deposited on a nucleating underlayer formed between the substrate and the CoPt magnetic layer. In such a magnetic film structure, the nucleating layer enhances the HCP crystalline growth of the CoPt magnetic layer, which results in a CoPt film with a component of the C-axis in the plane of the film. The horizontal coercivity of such CoPt films is a function of the deposition temperature, the type of underlayer and the thickness of the CoPt film. The graph of FIG. 1 illustrates the general relationship between horizontal coercivity of CoPt films, with 10 at. % platinum ($Co_{90}Pt_{10}$), as a function of CoPt film thickness. The data shown in FIG. 1 is for thin film disks in which the substrate is single crystal semiconductor grade silicon and the underlayer is a 3700 Angstroms thick film of chromium-cobalt, with 20 at. % cobalt ($Cr_{80}Co_{20}$). The deposition of the $Cr_{80}Co_{20}$ underlayer and $Co_{90}Pt_{10}$ magnetic layers was by DC magnetron sputter deposition at an Argon pressure of $2\times10^{-3}$ Torr and a substrate temperature of approximately 145° to 155° C. An X-ray diffraction analysis of such disks depicts reflection peaks corresponding to the (110) plane of the CoPt film and the (200) plane of the CrCo underlayer, thereby confirming the strong in-plane orientation of the C-axis of the HCP CoPt film in such disks.

Figure 3:
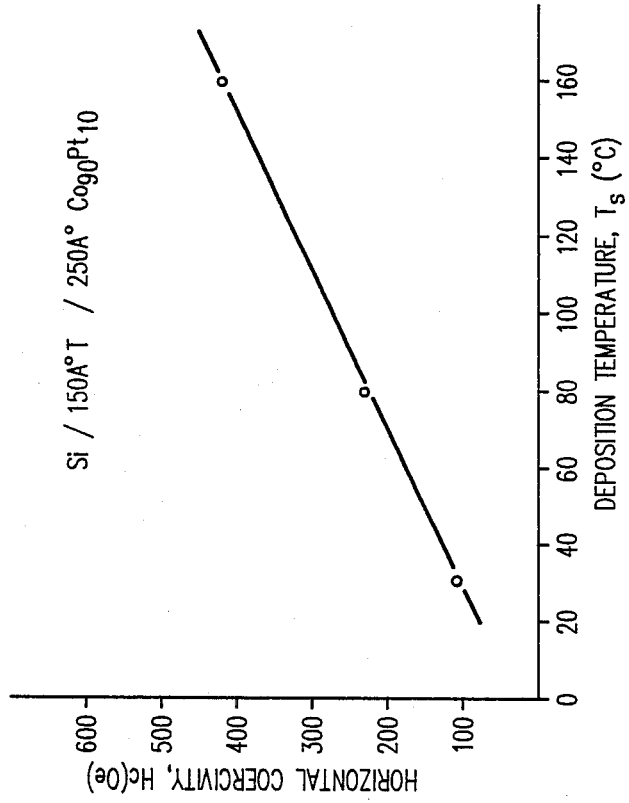
FIG. 3 is a graph illustrating the horizontal (in-plane) coercivity of a 250 Angstroms thick CoPt film over a 150 Angstroms thick Ti nucleating film as a function of substrate deposition temperature.

As part of the development of the multilayered vertical recording medium of the present invention, a single layer structure was first made by forming a $Co_{90}Pt_{10}$ film of 250 Angstroms thickness on a 150 Angstroms thick titanium (Ti) film on a silicon substrate. The film was formed by DC magnetron sputtering at a substrate deposition temperature of 160° C. and an Argon pressure of $2\times10^{-3}$ Torr. An X-ray diffraction analysis of the film is shown in FIG. 2. The peak at $2\theta=37.9°$ corresponds to a reflection from the (002) plane of the Ti film and the peak at $2\theta=43.6°$ corresponds to a reflection from the (002) plane of the CoPt film. Thus FIG. 2 confirms that when the 250 Angstroms thick CoPt film is formed on the HCP Ti film, the preferred orientation of the C-axis of the HCP CoPt film is perpendicular to the plane of the film. The horizontal coercivity of the film measured in FIG. 2 and two other identical films formed at lower substrate deposition temperatures is shown in FIG. 3. The very low value for the horizontal coercivity depicted in FIG. 3 confirms the perpendicular magnetic anisotropy of the C-axis perpendicular preferred orientation structure composed of a Ti film and a 250 Angstroms thick $Co_{90}Pt_{10}$ magnetic film. As the deposition temperature is increased (FIG. 3), the in-plane coercivity increases, i.e. the perpendicular magnetic anisotropy is diminished. An M-H loop measurement for the Si/150 Å Ti/250 Å $Co_{90}Pt_{10}$ structure showed a perpendicular coercivity of approximately 200–300 Oe. Thus a Ti nucleating film can sustain a perpendicular C-axis orientation (FIG. 2) and perpendicular magnetic anisotropy in thin (less than or equal to approximately 250 Angstroms) $Co_{90}Pt_{10}$ films.

CoPt films of 250 Angstroms thickness were also sputter deposited on other HCP nucleating films, including an intermetallic compound of cobalt and tungsten ($Co_3W$). The use of $Co_3W$ as a nucleating film for vertical recording media is described in U.S. patent application No. 791,963, filed Oct. 28, 1985, which is assigned to the same assignee as this application.

It has been discovered that in the case of a CoPt film formed on an HCP nucleating film, the preferred orientation of the C-axis of the HCP CoPt film ceases being perpendicular to the film plane as the thickness of the CoPt film increases above approximately 250 Angstroms. As the CoPt film grows in thickness and develops a component of the C-axis in the plane, the film has horizontal magnetic anisotropy. However, if the thickness of the CoPt film formed on the HCP film is maintained less than approximately 250 Angstroms, then the preferred orientation of the C-axis is perpendicular to the plane, even though the perpendicular coercivity of such a single film is insufficient to function as a recording medium.

Figure 4:
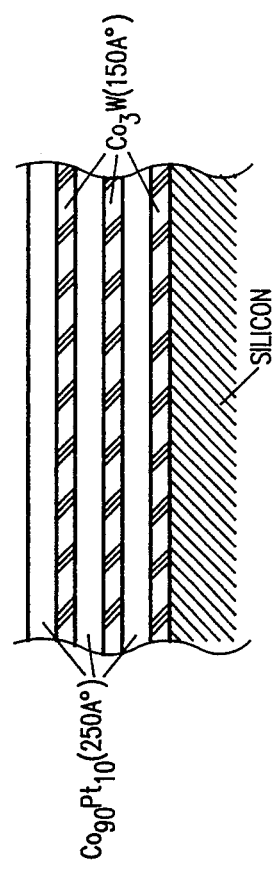
FIG. 4 is a cross-sectional representation of a three-layer film structure according to the present invention.
Figure 5:
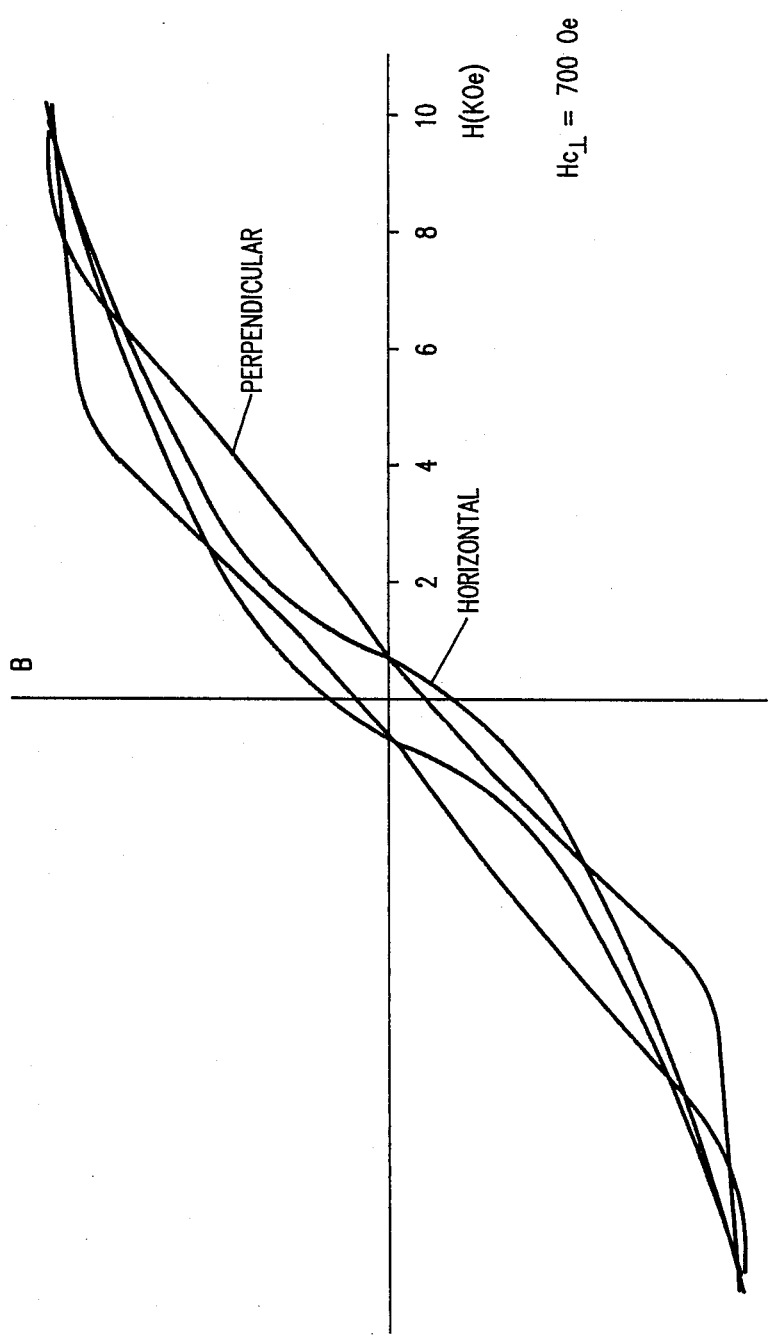
FIG. 5 is a B-H loop for the three-layer film structure depicted in FIG. 4.

In accordance with the present invention a laminated or multilayered magnetic film structure was formed in which each layer in the structure comprised a 150 Angstroms thick $Co_3W$ film and a 250 Angstroms thick $Co_{90}Pt_{10}$ film. In this multilayered film structure, the perpendicular coercivity is substantially greater than in a single layer. A sectional view of a three layer structure according to the present invention is depicted in FIG. 4. FIG. 5 is a B-H loop of the three-layer structure shown in FIG. 4. The perpendicular coercivity is 700 Oersteds (Oe), which is considerably greater than the coercivity for a single CoPt film formed on a single HCP nucleating film, e.g. 200–300 Oe for a 250 Angstroms thick $Co_{90}Pt_{10}$ film on a 150 Angstroms thick Ti film.

Thus a laminated or multilayered structure in which CoPt films are alternated with highly oriented HCP nucleating films results in a suitable medium for vertical magnetic recording. The number of layers in the laminated structure, the thickness of each layer and the deposition temperature can be varied to optimize the vertical recording performance. For example the perpendicular and in-plane coercivities of the structure can be adjusted by changing the thicknesses of the nucleating film and the CoPt film.

Suitable HCP nucleating films in addition to Ti and $Co_3W$ are rhenium (Re), osmium (Os), ruthenium (Ru), hafnium (Hf), zirconium (Zr), and the beta phase of tantalum ($\beta$-Ta). The use of $\beta$-Ta as a nucleating film for vertical recording media is described in U.S. patent application No. 779,324, filed Apr. 22, 1985, which is assigned to the same assignee as this application.

While Pt is the preferred element as part of the cobalt-based alloy forming the magnetic film in each layer of the laminated structure, other elements suitable for use in the cobalt-based alloy are nickel (Ni), rhenium (Re) and palladium (Pd). All of these elements are known as capable for use in cobalt-based alloys for horizontal magnetic recording.

In those applications of the vertical recording medium where it is desired to utilize pole heads on the same side of the medium, such as in a flexible disk application, it is necessary to have an underlayer between the substrate and the multilayered film structure to provide a magnetic flux return path in the medium. A conventional underlayer for this purpose is a layer of nickel-iron (NiFe).

The above description and drawings relate only to the inventive structures which form a part of the vertical recording media, and not to the conventional well-known portions of the media and the media fabrication processes. For example, in the fabrication of thin film metal alloy disks, it is known to provide a protective overcoat, such as a sputtered carbon film, over the magnetic film and, in certain instances, to provide an adhesion layer, such as sputtered titanium film, between the overcoat and the magnetic film. In the present invention the adhesion layer and protective overcoat are formed over the uppermost layer in the multilayered film structure.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A medium for vertical magnetic recording comprising:
    a substrate; and
    a multilayered magnetic film structure formed on the substrate, each layer in the structure further comprising a nucleating film of titanium or an intermetallic compound of cobalt and tungsten ($Co_3W$) and a magnetic film of a cobalt-platinum (CoPt) alloy formed on the nucleating film, the CoPt alloy film in each layer having substantially perpendicular magnetic anisotropy.

* * * * *